United States Patent [19]

Gras et al.

[11] Patent Number: 4,782,128
[45] Date of Patent: Nov. 1, 1988

[54] POLYURETHANE POWDER COATING COMPOSITIONS WHICH YIELD A MATTE SURFACE AFTER SETTING

[75] Inventors: Rainer Gras, Bochum; Elmar Wolf, Recklinghausen, both of Fed. Rep. of Germany

[73] Assignee: Hüls Aktiengesellschaft, Marl, Fed. Rep. of Germany

[21] Appl. No.: 154,014

[22] Filed: Feb. 9, 1988

[30] Foreign Application Priority Data

Apr. 4, 1987 [DE] Fed. Rep. of Germany ....... 3711374

[51] Int. Cl.$^4$ .............................................. C08G 18/80
[52] U.S. Cl. ...................................................... 528/45
[58] Field of Search ........................................... 528/45

[56] References Cited

U.S. PATENT DOCUMENTS 4,395,529  7/1983  Ponandiker et al. ................. 528/45
4,528,355  7/1985  Gras et al. ............................. 528/45

Primary Examiner—Maurice J. Welsh
Attorney, Agent, or Firm—Oblon, Fisher, Spivak, McClelland & Maier

[57] ABSTRACT

Polyurethane powder coating compositions which yield a matte surface after setting. The principal means of achieving matte surfaces with powder coating compositions is by adding fillers. These additives are detrimental to the coating properties. The known binder systems based on cycloaliphatic diisocyanate adducts which yield matte surfaces after setting are either of a complex nature or are inherently costly to prepare. These disadvantages are avoided if the polyurethane powder coating compositions are comprised of OH-group-containing polymers, and trans-1,4-cyclohexanediisocyanate (CHDI) adducts blocked with epsilon-caprolactam.

7 Claims, No Drawings

POLYURETHANE POWDER COATING COMPOSITIONS WHICH YIELD A MATTE SURFACE AFTER SETTING

BACKGROUND OF THE INVENTION

1. Field of the Invention

The invention relates to polyurethane powder coating compositions (PUR PCCs) based on trans-1,4-cyclohexanediisocyanate (CHDI) adducts blocked by epsilon-caprolactam. These adducts serve as isocyanate components, wherein the PUR PCCs yield a matte surface after setting.

2. Discussion of the Background

Quite often a high gloss is not desired with a given coating. There may be numerous reasons for this; e.g., the fact that a high gloss surface may require much more cleaning than a matte surface; or safety considerations of avoiding glare.

The simplest principle by which a matte surface is obtained is admixture of filler materials, e.g., chalk, finely divided $SiO_2$, or barium sulfate, into the PCC, in an amount correlated with the desired matte effect. However, such admixture is detrimental to the properties of the coating, e.g., adhesion, flexibility, impact strength, and chemical resistance.

PCCs based on cycloaliphatic diisocyanates and OH-group-containing polymers are known. The most industrially important of these are PCCs based on adducts of isophoronediisocyanate (IPDI).

Whether one begins with epsilon-caprolactam-blocked adducts of IPDI and chain-lengthening agents (see Ger. Nos. OS 21 05 777 and OS 25 42 191), or with isocyanate-group-containing IPDI adducts (see Ger. No. OS 27 35 497), after hardening one always obtains high gloss surfaces.

Also known are PCCs based on cycloaliphatic diisocyanate adducts which yield matte surfaces after setting. However, these are accompanied by various disadvantages. Thus, the uretdione-group-containing hardeners described in Ger. No. OS 33 28 133 are costly to produce and are temperature sensitive. Ger. No. OS 32 32 463 describes a complex 3-component mixture comprised of a carboxyl-group-containing isocyanate component, an alcohol component, and an epoxide.

It is known from Ger. Pat. App. No. P 35 36 017 that powder mixtures with epsilon-caprolactam-blocked trans-1,4-cyclohexanediisocyanate (CHDI) as a hardener yield high gloss PUR coatings after setting.

SUMMARY OF THE INVENTION

Accordingly, the object of the present invention is to provide PCCs based on OH-group-containing polymers and cycloaliphatic diisocyanates, particularly CHDI, which yield a matte surface after setting and which do not have the above-mentioned disadvantages.

This and other objects which will become apparent from the following specification are achieved by the inventive PUR PCCs, which contain the following binder components:

Isocyanate Component A, comprising:

(A1) Adducts of epsilon-caprolactam-blocked CHDI and diols and/or triols; and/or (A2) An epsilon-caprolactam-blocked trimer of CHDI; and (A3) Epsilon-caprolactam-blocked CHDI and/or epsilon-caprolactam-blocked IPDI, in the amount of 0–50 wt.% on the basis of the weight of Components A1 and A2 present; and Alcohol Component B, comprising OH-group-containing polymers of types well known in PUR chemistry.

The substances A1 are preferably prepared using the following diols and triols, wherein the ratio x of NCO to OH (equivalent basis) is at least 2 and at most 7:

(a) Diols of formula $$HO-(CH_2)_n-OH,$$

with $2 \leq n \leq 12$;

(b) Ether-group-containing alkylene glycols of formula $$HO-[-(CH_2)_p-O]_m-H,$$

with m=2 or 3, and p=2, 3, and 4; and (c) 2,2-Dihydroxymethyl-1-butanol.

For the reaction with epsilon-caprolactam, the ratio y of NH to NCO (equivalent basis) is at least 0.8 and at most 1.0.

A2, the blocked CHDI trimer, is preferably prepared by reacting trimerized CHDI with epsilon-caprolactam, with a ratio z of NH to NCO (equivalent basis) of at least 0.8 and at most 1.0.

The components A and B are preferably combined in a ratio such that the OH to NCO ratio is between 1:0.9 and 1:1.1.

Component B is preferably a polyester with melting point 70°–120° C.

The preparation of isocyanate component A1 is readily accomplished. Two stages are employed. In the first stage, CHDI is reacted with the diol and/or triol such that 2–7, particularly 2–4 NCO equivalents of CHDI are reacted per OH equivalent of the alcohol. In the second stage the blocking with epsilon-caprolactam is carried out, with 1–0.8 mol epsilon-caprolactam being reacted per NCO equivalent. In the first stage, the reaction components are heated at 120°–160° C. until the desired NCO content is reached. Then the epsilon-caprolactam is added portionwise at 160°–180° C. It is very advantageous to raise the temperature to 200°–220° C. for a short period in order to produce a homogeneous melt as quickly as possible. Then the reaction mixture is cooled to 170° C. and held at that temperature until the NCO content falls below 0.7%.

Alternatively, it is possible to reverse the sequence of the stages, whereby CHDI is first reacted with the epsilon-caprolactam and then with a diol and/or triol.

For chain lengthening, the following polyhydric alcohols are particularly suitable:

(a) Diols of general formula HO—R—OH, where R represents an aliphatic alkylene group with 2–14 carbon atoms, which may bear substituents comprising alkyl groups with 1–4 carbon atoms.

Preferred are diols wherein R represents $-(CH_2)_n$ (with n=2–12); also neopentyl glycol;

(b) Ether-group-containing alkylene glycols of formula $$HO-[-(CH_2)_p-O]_m-H,$$

with m=2 or 3, and p=2, 3, and 4;

(c) Triols with 4–10 carbon atoms, e.g. 2,2-dihydroxymethyl-1-butanol;

(d) Tris(hydroxyethyl) isocyanurate.

The blocked CHDI adducts preferably melt at 150°–220° C., and preferably contain blocked NCO in the amount of 10–20% and free NCO in the amount of 0–4%.

The isocyanurate-group-containing adducts are also prepared in two stages. In the first stage, CHDI is trimerized, and in the second stage the reaction mixture containing the isocyanurate groups is reacted with epsilon-caprolactam such that 1–0.8 mol epsilon-caprolactam is reacted per equivalent of NCO. Preferably, the trimerization of the CHDI is carried out with a catalyst, preferably a quarternary ammonium salt (see Ger. No. OS 29 16 201), added in the amount of 0.5–2.0%. The reaction mixture is then heated over a period of a few minutes, until a temperature of 120°–160° C. is reached. After the maximum temperature is reached, the reaction is terminated. The amount of catalyst depends on the degree of conversion sought. The higher the conversion sought, the greater the amount of catalyst required. For a very high conversion, it has proved advantageous to carry out the trimerization in two stages, wherewith in the first stage CHDI (which is 50.6% NCO) is trimerized to an NCO content of 35–40%, and in the second stage the reaction mixture is brought (trimerization) to an NCO content of 25–30%, by addition of additional catalyst. The procedure of epsilon-caprolactam blocking of the isocyanurate-group-containing CHDI is as described above. The thus prepared adducts preferably have m.p. 140°–220° C., and are further characterized by a content of isocyanurate groups (as CO-N) of, preferably, 3–15%, and a content of blocked NCO groups of, preferably, 8–20%.

The just-described preparation can also be carried out in inert solvents. Preferred solvents are toluene, acetic acid, dimethylformamide, N-methylpyrrolidone, etc.

Epsilon-caprolactam-blocked CHDI and/or epsilon-caprolactam-blocked IPDI may be employed as the isocyanate component A3. The amount of component A3 is not more than 50 wt.% of the amount of components A1 and A2 taken together. The preferred isocyanate component is only A1 or only A2.

The components A1, A2, and A3 may be prepared separately and then mixed. However, it is possible to carry out the blocking step with mixtures of the intermediate products of components A1, A2, and A3, thereby directly obtaining the desired mixture.

As component B of the inventive PCCs, in principle all OH-group-containing polymers known in PUR chemistry are suitable. The preferable polymers are those which are solid and have m.p. between 70° and 120° C., preferably 80°–100° C. The OH number is ordinarily between 10 and 200, preferably between 30 and 100.

The following compound classes are preferred as component B:

(a) Polyesters, particularly reaction products of polyhydric alcohols with polycarboxylic acids, preferably polyesters based on dihydric and trihydric alcohols and dicarboxylic acids;

(b) Polyepoxides, particularly reaction products of bisphenol A with epichlorohydrin;

(c) Polyacrylates, particularly those with M.W. 300–6,000.

The inventive PCCs enable gloss values of 10 to be achieved (measured according to Gardner, at a 60° angle). The gloss value can be adjusted within a wide range, by various techniques.

When adduct A1 is employed, in general the gloss value decreases as urethane group content increases (thus, as NCO content decreases). When isocyanurate-group-containing adduct A2 is employed, the gloss value increases as NCO content decreases. When component A3 is employed, the gloss value generally increases as the amount of component A3 increases.

The mixture ratio of OH-group-containing polymers and isocyanate components is generally selected such that 0.9–1.1, preferably 1.0 NCO groups are present per OH group.

The isocyanate component is mixed with the OH-group-containing polymers and, optionally, catalysts such as, e.g., dibutyltin dilaurate or zinc octanoate, optionally along with other additives, such as pigments, fillers, and leveling agents, and the mixture is mixed thoroughly in the melt. The thorough mixing may be accomplished in suitable industrial apparatus, e.g. heatable kneaders, but preferably in extruders. Temperature limits of 130° C. should not be exceeded in this mixing. The extruded mass is cooled to room temperature, and is comminuted and ground by suitable means, to yield a PCC. Known techniques may be used for applying thus prepared PCC to suitable substrates, e.g. electrostatic powder spraying, whirl sintering, electrostatic whirl sintering, etc. After the PCC is applied by one of the mentioned techniques, the coated workpiece are heated to 160°–220° C. for 40–10 min., preferably to 170°–220° C. for 30–10 min. for setting.

The thus-produced coatings are distinguished by the excellent properties for which PUR PCCs are known.

Other features of the invention will become apparent in the course of the following descriptions of exemplary embodiments which are given for illustration of the invention and are not intended to be limiting thereof.

EXAMPLES

A. Preparation of the Inventively Employed Hardeners

A1. General Preparation of the Urethane-Group-Containing Hardeners (A1):

CHDI and the polyol are heated together at 120°–160° C. until all the OH groups have reacted. Then the epsilon-caprolactam is added portionwise at 180° C. In order to produce a homogeneous melt as quickly as possible, it has proven advantageous to heat the reaction mixture to 200°–220° C. for a short period. Then the mixture is cooled to 180° C., at which temperature it is held until the calculated NCO content is reached.

The hardeners of Examples 1–12 (Table 1) were prepared by this method.

TABLE 1

| Example No. | Moles | | | Latent NCO content % | Free NCO content % | Melting Range, °C. |
|---|---|---|---|---|---|---|
| | CHDI | Polyol | Epsilon Caprolactam | | | |
| 1 | 2 | 1 (Ethylene glycol) | 1.75 | 14.0 | 1.6 | 210 |
| 2 | 2 | 1 (Ethylene glycol) | 2 | 13.1 | <0.5 | >200 |
| 3 | 2 | 1 (1,4-Butanediol) | 2 | 12.6 | <0.6 | 200 |
| 4 | 2 | 1 (Diethylene glycol) | 2 | 11.6 | <0.5 | 180–188 |

TABLE 1-continued

| Example No. | Moles | | | Latent NCO content % | Free NCO content % | Melting Range, °C. |
|---|---|---|---|---|---|---|
| | CHDI | Polyol | Epsilon Caprolactam | | | |
| 5 | 2 | 1 (1,6-Hexanediol) | 2 | 12.2 | <0.5 | >200 |
| 6 | 2 | 1 (1,12-Dodecanediol) | 2 | 10.9 | <0.7 | >200 |
| 7 | 4 | 1 (1,12-Dodecanediol) | 6 | 15.0 | <0.7 | 160-162 |
| 8 | 4 | 1 (1,12-Dodecanediol) | 5 | 16.4 | 3.0 | 169-171 |
| 9 | 4 | 1 (Neopentyl glycol) | 6 | 17.3 | <0.5 | 200 |
| 10 | 6 | 1 (2,2-Dihydroxy-methyl-1-butanol) | 9 | 17.4 | <0.5 | 186-188 |
| 11 | 4 | 1 (2,2-Dihydroxy-methyl-1-butanol) | 5 | 14.6 | <0.6 | 168-170 |
| 12 | 6 | 1 (2,2-Dihydroxy-methyl-1-butanol) | 7.75 | 16.9 | 2.5 | 169-171 |

A2. General Preparation of the Isocyanurate-Group-Containing Hardeners (A2):

Dabco ® TMR 2 (trimethyl betahydroxypropylammonium formate) in an amount of 0.5-2% (depending on the desired conversion) is added to CHDI heated to 90° C. Within a few minutes the temperature increases to 120°-160° C. After the maximum temperature is reached, the reaction is terminated. Epsilon-caprolactam-blocking is then carried out by a method analogous to the general method described above for the urethane-group-containing hardeners.

The hardeners of Examples 13-17 (Table 2) were prepared by the 2-step method as just described, comprising catalyzed trimerization of CHDI followed by epsilon-caprolactam-blocking.

TABLE 2

| Example No. | % NCO in the trimerized CHDI | Moles epsilon-caprolactam per equivalent of NCO in the trimerized CHDI | Latent NCO content, % NCO | Free NCO content, % NCO | Melting range °C. |
|---|---|---|---|---|---|
| 13 | 26.2 | 1 | 15.3 | <0.5 | 168-170 |
| 14 | 25.7 | 0.8 | 16.1 | 2.5 | 171-173 |
| 15 | 30.4 | 1 | 16.36 | <0.7 | 178-180 |
| 16 | 34.0 | 1 | 17.7 | <0.7 | 185 |
| 17 | 40.0 | 1 | 19.3 | <0.7 | 200-202 |

Example 18

470 parts by wt. trimerized CHDI with NCO content 29.6% was mixed with 77 parts by wt. IPDI at 150° C. 450 parts by wt. epsilon-caprolactam was added portionwise to this mixture at 180° C. After completion of the epsilon-caprolactam addition, the reaction mixture was heated at 170° C. until its NCO content was less than 0.7%. The reaction product had a melting point of 148°-150° C., and a latent NCO content of 16.4%.

Example 19

231 parts by wt. trimerized CHDI with NCO content 29.2% was mixed with 291 parts by wt. IPDI, and was blocked with 478 parts by wt. epsilon-caprolactam in the manner described in Example 18. The reaction product had a melting point of 76°-78° C., and a latent NCO content of 17.3%.

Example 20

(Comparsion Example)

444 parts by wt. IPDI was heated with 106 parts by wt. diethylene glycol at 80° C. until the NCO content reached 15.2%. Then 226 parts by wt. epsilon-caprolactam was added portionwise at 120° C. Following the epsilon-caprolactam addition, the reaction mixture was heated at 120° C. until its NCO content was less than 0.7%. The reaction product had a melting point of 73°-76° C., and a latent NCO content of 10%.

Example 21

(Comparsion Example)

888 parts of wt. IPDI was heated with 134 parts by wt. neopentyl glycol at 80° C. until the NCO content reached 26.5%. Then 678 parts by wt. epsilon-caprolactam was added portionwise at 130° C. and the mixture was further heated until the NCO content decreased to about 0.5%. The reaction product had a melting point of about 70° C., and a latent NCO content of 14.8%.

Example 22

(Comparsion Example)

1000 parts by wt. IPDI was heated 4 hr at 120° C. with 5 parts by wt. of a 1:2 (by wt.) mixture of Dabco ® and propylene oxide. At this point the reaction mixture had an NCO content of 26%. 700 parts by wt. epsilon-caprolactam was then added portionwise under intensive stirring, and was further heated at 120°-130° C. until the NCO content of the reaction mixture was less than 0.7%. The reaction product had a melting point of 84°-87° C., and a latent NCO content of 15%.

EXAMPLE 23

(Comparison Example)

468 parts by wt. epsilon-caprolactam was added portionwise at 170° C. to 1000 parts by wt. trimeric IPDI (prepared according to Ger. OS 29 16 201, Example 30) with a monomer content of 0.6% and a NCO content of 17.4%. After completion of the addition of the epsilon-caprolactam, the mixture was heated until the NCO content had fallen to less than 0.7%. The reaction product had a melting point of 155°-160° C., and a latent NCO content of 11.5%.

B.

The Polyol Component

General Method of Preparation of the Polyol Component (B)

The starting components terephthalic acid, dimethyl terephthalate, 1,6-hexanediol, neopentyl glycol, 1,4-dihydroxymethylcyclohexane, and 2,2-dihydroxymethyl-1-butanol were charged to a reactor and heated by an oil bath. After most of the material had been melted, di-n-butyltin oxide in the amount of 0.05 wt.% was added as a catalyst, at 160° C. The first methanol abstraction occurred at about 170° C. After 6-8 hr the temperature was increased to 220°-230° C. and the reaction was terminated in another 12-15 hr. The polyester was cooled to 200° C., and volatile materials were thoroughly removed by application of a vacuum (1.33 mbar) for 30-45 min. During the entire period of the reaction the sump product was stirred and a gentle, nitrogen stream was passed through the reaction mixture.

The compositions of the polyesters and the corresponding physical and chemical characterizing parameters are given in Table 3.

TABLE 3

| Example No. | Starting Substances | | | | | | Chemical and physical characterizing parameters | | | | |
|---|---|---|---|---|---|---|---|---|---|---|---|
| | TS Mol | DMT Mol | HD Mol | NPG Mol | DMC Mol | TMP Mol | OH-No. mg KOH/g | Acid No. mg KOH/g | Melting point °C. | DTA+ °C. | Viscosity at 160° C., mPa-sec. |
| 1 | 10 | 10 | 6.25 | 10.5 | 2 | 2.9 | 55-60 | 3-4 | 75 | 50 | ~25,000 |
| 2 | 9 | 9 | 3 | 13 | 3 | 1 | 50-56 | 3-4 | 70 | 50 | ~10,000 |
| 3 | Alftalat ® AN 739, a polyester supplied by Hoechst | | | | | | 55-60 | 2-3 | 70 | 50 | ~28,000 |
| 4 | Crelan ® U 502, a polyester supplied by Bayer | | | | | | 45-55 | <10 | 75-79 | 47-57 | ~23,400 |

TS = Terephthalic acid
DMT = Dimethyl terephthalate
HD = 1,6-Hexanediol
NPG = Neopentyl glycol
DMC = Dihydroxymethyl cyclohexane
TMP = 2,2-Dihydroxymethyl-1-butanol
+ = Glass transition temperature (by differential thermal analysis)

C.

Polyurethane Powder Coating Compositions (PUR PCCs)

General Method of Preparation of PUR PCCs

The ground products, crosslinking agents, polyesters, and the leveling agent (mixed in master batch), along with the catalyst, if any (mixed in a master batch), were intimately mixed with the white pigment, if any, and fillers, if any, in an edge mill, and were then thoroughly mixed in an extruder at 90°-130° C. After cooling, the extrudate was broken up and ground to a particle size of <100 um in a pinned disc mill. The powder thus prepared was applied with an electrostatic power spray apparatus at 60 kV onto a degreased, possibly pretreated iron plate, and baked-on in a circulating-air oven at temperature between 160° and 200° C.

Leveling Agent Master Batch

The leveling agent, a commercially available copolymer of butyl acrylate and 2-ethylhexyl acrylate, in the amount of 10 wt.%, was thoroughly mixed into the given polyester in the melt, and was comminuted following soldification.

Catalyst Master Batch

The catalyst, here di-n-butyltin dilaurate, in the amount of 5 wt.%, was thoroughly mixed into the given polyester in the melt, and was comminuted following solidification.

EXAMPLE C-1

Pigmented enamel

The PCC having the following formula was prepared, applied, and baked-on at between 180° and 200° C., according to the method described above. Units of measure are parts by weight for Examples C-1 through C-37.
Polyester according to Example B1: 412.3
Crosslinking agent according to Example A1: 137.7
White pigment (TiO$_2$): 400.0
Leveling agent (master batch): 50.0

| Baking-on conditions Time/Temp. | C-1 | | | | | |
|---|---|---|---|---|---|---|
| | Mechanical Characterizing data | | | | | |
| | SD | HB | ET | GS | Imp. rev. | GG-60° |
| 15'/200° C. | 50-60 | 100 | 6.4-7.3 | 0 | 460.8 | 18 |
| 20'/200° C. | 60 | 100 | 7.2-7.7 | 0 | 460.8 | 20 |
| 25'/200° C. | 50-60 | 100 | 8.7-9.0 | 0 | 806.4 | 17 |
| 25'/180° C. | 40-60 | 91 | 3.8-4.0 | 0 | 460.8 | 20 |
| 30'/180° C. | 50-60 | 100 | 3.9-4.7 | 0 | 230.4 | 20 |

SD = Coating thickness (microns)
HB = Hardness, Buchholz (DIN 53 153)
ET = Enrichsen cupping test depression (mm, DIN 53 156)
GS = Grid-cutting test value (DIN 53 151)
Imp. rev. = Impact reverse (g-m)
GG-60° = Gardener glass value at 60° (ASTM-D 523)

EXAMPLE C-2

Pigmented enamel

The PCC having the following formula was prepared, applied, and baked-on at between 180° and 200° C., according to the method described above.
Polyester according to Example B1: 402.4
Crosslinking agent according to Example A2: 147.7
White pigment (TiO$_2$): 400.0
Leveling agent (master batch): 50.0

C-2

| Baking-on conditions Time/Temp. | Mechanical Characterizing data | | | | | |
|---|---|---|---|---|---|---|
| | SD | HB | ET | GS | Imp. rev. | GG-60° |
| 15′/200° C. | 50–60 | 100 | 4.4–5.3 | 0 | 115.2 | 22 |
| 20′/200° C. | 50–60 | 100 | 6.1–6.4 | 0 | 230.4 | 23 |
| 25′/200° C. | 70 | 100 | 5.9–6.5 | 0 | 230.4 | 24 |
| 25′/180° C. | 60–80 | 100 | 3.1–3.3 | 0 | 115.2 | 26 |
| 30′/180° C. | 50–60 | 100 | 3.8–4.1 | 0 | 115.2 | 24 |

EXAMPLE C-3

Pigmented enamel

The PCC having the following formula was prepared, applied, and baked-on at between 170° and 200° C., according to the method described above.
Polyester according to Example B1: 388.4
Crosslinking agent according to Example A4: 161.6
White pigment (TiO$_2$): 400.0
Leveling agent (master batch): 50.0

C-3

| Baking-on conditions Time/Temp. | Mechanical Characterizing data | | | | | |
|---|---|---|---|---|---|---|
| | SD | HB | ET | GS | Imp. rev. | GG-60° |
| 12′/200° C. | 40–50 | — | 7.8–8.3 | 0 | >944.6 | 18 |
| 15′/200° C. | 60–70 | — | 9.5–9.6 | 0 | >944.6 | 20 |
| 20′/200° C. | 70–80 | — | 9.6–>10 | 0 | >944.6 | 20 |
| 20′/180° C. | 50–60 | — | 5.4–7.2 | 0 | >944.6 | 16 |
| 25′/100° C. | 60 | — | 9.1–9.3 | 0 | >944.6 | 17 |
| 30′/180° C. | 60–80 | — | 8.3–9.0 | | >944.6 | 19 |
| 25′/170° C. | 50–60 | — | 5.0–5.5 | 0 | >944.6 | 17 |
| 30′/170° C. | 50–60 | — | 6.2–7.2 | 0 | >944.6 | 17 |

EXAMPLE C-4

Pigmented enamel

The PCC having the following formula was prepared, applied, and baked-on at between 180° and 200° C., according to the method described above.
Polyester according to Example B1: 394.1
Crosslinking agent according to Example A5: 155.9
White pigment (TiO$_2$): 400.0
Leveling agent (master batch): 50.0

C-4

| Baking-on conditions Time/Temp. | Mechanical Characterizing data | | | | | |
|---|---|---|---|---|---|---|
| | SD | HB | ET | GS | Imp. rev. | GG-60° |
| 15′/200° C. | 60–80 | 111 | 3.8–4.0 | 0 | 230.4 | 21 |
| 20′/200° C. | 70–80 | 111 | 4.0–4.8 | 0 | 115.2 | 24 |
| 25′/200° C. | 50–70 | 111 | 4.0–5.0 | 0 | 230.4 | 24 |
| 25′/180° C. | 50–60 | 111 | 5.4–6.0 | 0 | 115.2 | 21 |
| 30′/180° C. | 60–70 | 100 | 4.8–5.2 | 0 | 115.2 | 24 |

EXAMPLE C-5

Pigmented enamel

The PCC having the following formula was prepared, applied, and baked-on at between 180° and 200° C., according to the method described above.
Polyester according to Example B1: 380.9
Crosslinking agent according to Example A6: 169.1
White pigment (TiO$_2$): 400.0
Leveling agent (master batch): 50.0

C-5

| Baking-on conditions Time/Temp. | Mechanical Characterizing data | | | | | |
|---|---|---|---|---|---|---|
| | SD | HB | ET | GS | Imp. rev. | GG-60° |
| 15′/200° C. | 65–70 | 100 | 4.0–6.0 | 0 | 576.0 | 14 |
| 20′/200° C. | 60–70 | 100 | 7.8–9.6 | 0 | <944.6 | 14 |
| 25′/200° C. | 70–80 | 100 | 8.4–8.5 | 0 | >944.6 | 14 |
| 25′/180° C. | 60–80 | 100 | 4.8–5.0 | 0 | 576.0 | 12 |
| 30′/180° C. | 70–80 | 100 | 5.3–6.0 | 0 | 576.0 | 13 |

EXAMPLE C-6

Pigmented enamel

The PCC having the following formula was prepared, applied, and baked-on at between 180° and 200° C., according to the method described above.
Polyester according to Example B3: 375.5
Crosslinking agent according to Example A6: 174.5
White pigment (TiO$_2$): 400.0
Leveling agent (master batch): 50.0

C-6

| Baking-on conditions Time/Temp. | Mechanical Characterizing data | | | | | |
|---|---|---|---|---|---|---|
| | SD | HB | ET | GS | Imp. rev. | GG-60° |
| 15′/200° C. | 70–80 | 100 | 7.3–7.4 | 0 | 806.4 | 13 |
| 20′/200° C. | 60–70 | 111 | 8.1–9.6 | 0 | 691.2 | 13 |
| 25′/200° C. | 70–90 | 125 | 7.5–9.1 | 0 | 806.4 | 14 |
| 20′/180° C. | 55–60 | 100 | 3.9–4.2 | 0 | 460.8 | 10 |
| 25′/180° C. | 60 | 111 | 3.7–4.2 | 0 | 230.4 | 9 |
| 30′/180° C. | 60–65 | 125 | 6.2–6.9 | 0 | 460.8 | 10 |

EXAMPLE C-7

Pigmented enamel

The PCC having the following formula was prepared, applied, and baked-on at between 180° and 200° C., according to the method described above.
Polyester according to Example B1: 417.0
Crosslinking agent according to Example A7: 124.0
White pigment (TiO$_2$): 400.0
Leveling agent (master batch): 50.0

C-7

| Baking-on conditions Time/Temp. | Mechanical Characterizing data | | | | | |
|---|---|---|---|---|---|---|
| | SD | HB | ET | GS | Imp. rev. | GG-60° |
| 15′/200° C. | 50–65 | 100 | >10 | 0 | >944.6 | 52 |
| 20′/200° C. | 50–65 | 111 | >10 | 0 | >944.6 | 53 |
| 25′/200° C. | 40–50 | 111 | >10 | 0 | >944.6 | 51 |
| 25′/180° C. | 50–70 | 100 | >10 | 0 | >944.6 | 54 |
| 30′/180° C. | 50–60 | 100 | >10 | 0 | >944.6 | 53 |

EXAMPLE C-8

Pigmented enamel

The PCC having the following formula was prepared, applied, and baked-on at between 180° and 200° C., according to the method described above.
Polyester according to Example B1: 417.0
Crosslinking agent according to Example A7: 133.0
White pigment (TiO$_2$): 400.0
Leveling agent (master batch): 50.0

| C-8 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 15'/200° C. | 40–60 | 111 | >10 | 0 | >944.6 | 56 |
| 20'/200° C. | 40–55 | 100 | >10 | 0 | >944.6 | 56 |
| 25'/200° C. | 40–60 | 100 | >10 | 0 | >944.6 | 57 |
| 20'/180° C. | 40–50 | 111 | 9.5–9.7 | 0 | 806.4 | 56 |
| 25'/180° C. | 40–50 | 125 | >10 | 0 | >944.6 | 57 |
| 30'/180° C. | 50–60 | 111 | >10 | 0 | >944.6 | 57 |

EXAMPLE C-9

Pigmented enamel

The PCC having the following formula was prepared, applied, and baked-on at between 170° and 200° C., according to the method described above.
Polyester according to Example B1: 425.7
Crosslinking agent according to Example A8: 124.3
White pigment (TiO$_2$): 400.0
Leveling agent (master batch): 50.0

| C-9 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 15'/200° C. | 50–60 | 100 | >10 | 0 | >944.6 | 55 |
| 20'/200° C. | 50 | 100 | >10 | 0 | >944.6 | 57 |
| 25'/200° C. | 50–75 | 100 | >10 | 0 | >944.6 | 58 |
| 20'/180° C. | 50–60 | 100 | >10 | 0 | >944.6 | 57 |
| 25'/180° C. | 50–65 | 100 | >10 | 0 | >944.6 | 57 |
| 30'/180° C. | 50–60 | 100 | >10 | 0 | >944.6 | 58 |
| 25'/170° C. | 50–60 | 100 | 9.4–9.7 | 0 | 691.2 | 57 |
| 30'/170° C. | 50–70 | 100 | 9.8–10 | 0 | 806.4 | 58 |

EXAMPLE C-10

Pigmented enamel

The PCC having the following formula was prepared, applied, and baked-on at between 170° and 200° C., according to the method described above.
Polyester according to Example B1: 431.0
Crosslinking agent according to Example A9: 119.0
White pigment (TiO$_2$): 400.0
Leveling agent (master batch): 50.0

| C-10 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 12'/200° C. | 50–60 | 100 | 8.6–9.0 | 0 | >944.6 | 51 |
| 15'/200° C. | 40–60 | 100 | >10 | 0 | >944.6 | 49 |
| 20'/200° C. | 50–60 | 100 | 9.5–>10 | 0 | >944.6 | 53 |
| 20'/180° C. | 40–50 | 100 | 9.0 | 0 | >944.6 | 50 |
| 25'/180° C. | 60 | 100 | 9.5–9.6 | 0 | 806.4 | 52 |
| 30'/180° C. | 50–60 | 100 | 9.8 | 0 | >944.6 | 52 |
| 25'/170° C. | 40–55 | 100 | 5.6–7.0 | 0 | 691.2 | 50 |
| 30'/170° C. | 50–60 | 100 | 7.0 | 0 | 806.4 | 53 |

EXAMPLE C-11

Pigmented enamel

The PCC having the following formula was prepared, applied, and baked-on at between 180° and 200° C., according to the method described above.
Polyester according to Example B3: 409.2
Crosslinking agent according to Example A11: 140.8
White pigment (TiO$_2$): 400.0
Leveling agent (master batch): 50.0

| C-11 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 15'/200° C. | 40–50 | 100 | 6.0–6.2 | 0 | 230.4 | 54 |
| 20'/200° C. | 40–50 | 100 | 5.3–6.0 | 0 | 230.4 | 58 |
| 25'/200° C. | 40–60 | 100 | 5.9–6.0 | 0 | 230.4 | 58 |
| 25'/180° C. | 50 | 100 | 3.7–4.2 | 0 | 115.2 | 56 |
| 30'/180° C. | 50–55 | 111 | 4.5–4.9 | 0 | 115.2 | 58 |

EXAMPLE C-12

Pigmented enamel

The PCC having the following formula was prepared, applied, and baked-on at between 180° and 200° C., according to the method described above.
Polyester according to Example B1: 414.1
Crosslinking agent according to Example A11: 135.9
White pigment (TiO$_2$): 400.0
Leveling agent (master batch): 50.0

| C-12 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 15'/200° C. | 45–55 | 111 | 6.8–7.5 | 0 | 230.4 | 47 |
| 20'/200° C. | 50–60 | 111 | 5.5–6.2 | 0 | 345.6 | 46 |
| 25'/200° C. | 50–60 | 111 | 6.8–7.5 | 0 | 230.4 | 43 |
| 25'/180° C. | 50–60 | 111 | 3.5–3.7 | 0 | 115.2 | 45 |
| 30'/180° C. | 50 | 111 | 4.5–5.7 | 0 | 115.2 | 47 |

EXAMPLE C-13

Pigmented enamel

The PCC having the following formula was prepared, applied, and baked-on at between 170° and 200° C., according to the method described above.
Polyester according to Example B1: 428.7
Crosslinking agent according to Example A12: 121.3
White pigment (TiO$_2$): 400.0
Leveling agent (master batch): 50.0

| C-13 | | | | | | |
|---|---|---|---|---|---|---|
| Baking-on conditions | Mechanical Charcterizing data | | | | | |
| Time/Temp. | SD | HB | ET | GS | Imp. rev. | GG-60° |
| 12'/200° C. | 50–60 | 100 | 9.1–9.5 | 0 | 806.4 | 47 |
| 15'/200° C. | 50–60 | 100 | >10 | 0 | >944.6 | 47 |
| 20'/200° C. | 50–60 | 100 | >10 | 0 | >944.6 | 48 |
| 20'/180° C. | 40–60 | 100 | 9.0–9.6 | 0 | 691.2 | 49 |
| 25'/180° C. | 45–60 | 100 | >10 | 0 | >944.6 | 50 |
| 30'/180° C. | 50–60 | 100 | 9.9–>10 | 0 | >944.6 | 50 |
| 25'/170° C. | 50–65 | 100 | 8.7–9.3 | 0 | 691.6 | 51 |
| 30'/170° C. | 55–60 | 100 | 8.9–9.5 | 0 | 576.0 | 49 |

EXAMPLE C-14

Pigmented enamel

The PCC having the following formula was prepared, applied, and baked-on at between 180° and 200° C., according to the method described above.
Polyester according to Example B1: 428.7
Crosslinking agent according to Example A12: 121.3

White pigment (TiO$_2$): 300.0
Leveling agent (master batch): 50.0
Durcal® 5: 100.0

| Baking-on conditions | C-14 | | | | | |
|---|---|---|---|---|---|---|
| | Mechanical Characterizing data | | | | | |
| Time/Temp. | SD | HB | ET | GS | Imp. rev. | GG-60° |
| 15'/200° C. | 50–60 | 100 | 7.5–8.2 | 0 | 345.6 | 40 |
| 20'/200° C. | 60–70 | 100 | 7.8–8.7 | 0 | 345.6 | 39 |
| 25'/200° C. | 50–70 | 100 | 8.0–8.6 | 0 | 460.8 | 42 |
| 25'/180° C. | 60–70 | 100 | 5.5–6.1 | 0 | 230.4 | 41 |
| 30'/180° C. | 50–60 | 100 | 6.2–7.0 | 0 | 345.6 | 40 |

EXAMPLE C-15

Pigmented enamel

The PCC having the following formula was prepared, applied, and baked-on at between 170° and 200° C., according to the method described above.
Polyester according to Example B1: 425.2
Crosslinking agent according to Example A13: 124.8
White pigment (TiO$_2$): 400.0
Leveling agent (master batch): 50.0

| Baking-on conditions | C-15 | | | | | |
|---|---|---|---|---|---|---|
| | Mechanical Characterizing data | | | | | |
| Time/Temp. | SD | HB | ET | GS | Imp. rev. | GG-60° |
| 12'/200° C. | 50–70 | 100 | 7.3–8.5 | 0 | >944.6 | 37 |
| 15'/200° C. | 40–50 | 100 | 7.5–8.2 | 0 | 806.4 | 35 |
| 20'/200° C. | 60 | 100 | 8.3–8.7 | 0 | 806.4 | 35 |
| 20'/180° C. | 40–50 | 100 | 6.8–7.0 | 0 | >944.6 | 40 |
| 25'/180° C. | 40–50 | 100 | 7.9–8.3 | 0 | 806.4 | 38 |
| 30'/180° C. | 40–50 | 111 | 8.4 | 0 | 806.4 | 39 |
| 25'/170° C. | 70–80 | 100 | 7.1–7.5 | 0 | 806.4 | 40 |
| 30'/170° C. | 60–65 | 100 | 8.5 | 0 | >944.6 | 36 |

EXAMPLE C-16

Pigmented enamel

The PCC having the following formula was prepared, applied, and baked-on at between 170° and 200° C., according to the method described above.
Polyester according to Example B2: 426.4
Crosslinking agent according to Example A13: 123.6
White pigment (TiO$_2$): 400.0
Leveling agent (master batch): 50.0

| Baking-on conditions | C-16 | | | | | |
|---|---|---|---|---|---|---|
| | Mechanical Characterizing data | | | | | |
| Time/Temp. | SD | HB | ET | GS | Imp. rev. | GG-60° |
| 12'/200° C. | 40–60 | 100 | 8.6–8.7 | 0 | >944.6 | 46 |
| 15'/200° C. | 50–60 | 125 | >10 | 0 | >944.6 | 42 |
| 20'/200° C. | 40–50 | 111 | >10 | 0 | >944.6 | 42 |
| 20'/180° C. | 40–50 | 111 | 7.8–8.0 | 0 | >944.6 | 48 |
| 25'/180° C. | 40–50 | 111 | >10 | 0 | >944.6 | 48 |
| 30'/180° C. | 40–50 | 111 | >10 | 0 | >944.6 | 46 |
| 25'/170° C. | 40–50 | 100 | 8.4–8.7 | 0 | >944.6 | 48 |
| 30'/170° C. | 45–60 | 100 | 8.7–8.8 | 0 | >944.6 | 49 |

EXAMPLE C-17

Pigmented enamel

The PCC having the following formula was prepared, applied, and baked-on at between 170° and 200° C., according to the method described above.
Polyester according to Example B3: 420.8
Crosslinking agent according to Example A13: 129.2
White pigment (TiO$_2$): 400.0
Leveling agent (master batch): 50.0

| Baking-on conditions | C-17 | | | | | |
|---|---|---|---|---|---|---|
| | Mechanical Characterizing data | | | | | |
| Time/Temp. | SD | HB | ET | GS | Imp. rev. | GG-60° |
| 12'/200° C. | 60–70 | 100 | 6.9–7.8 | 0 | 691.2 | 44 |
| 15'/200° C. | 50–70 | 100 | 7.2–8.0 | 0 | 806.4 | 42 |
| 20'/200° C. | 60–70 | 100 | 7.7–8.5 | 0 | 806.4 | 45 |
| 20'/180° C. | 50–60 | 100 | 6.2–6.9 | 0 | 691.2 | 43 |
| 25'/180° C. | 40–60 | 111 | 6.7–7.5 | 0 | 691.2 | 46 |
| 30'/180° C. | 50–65 | 100 | 8.0–8.3 | 0 | 806.4 | 45 |
| 25'/170° C. | 40–60 | 100 | 6.4–7.0 | 0 | 691.2 | 44 |
| 30'/170° C. | 50–60 | 111 | 7.5–8.1 | 0 | 860.4 | 45 |

EXAMPLE C-18

Pigmented enamel

The PCC having the following formula was prepared, applied, and baked-on at between 170° and 200° C., according to the method described above.
Polyester according to Example B1: 425.2
Crosslinking agent according to Example A13: 124.8
White pigment (TiO$_2$): 300.0
Leveling agent (master batch): 50.0
Durcal® 5: 100.0

| Baking-on conditions | C-18 | | | | | |
|---|---|---|---|---|---|---|
| | Mechanical Characterizing data | | | | | |
| Time/Temp. | SD | HB | ET | GS | Imp. rev. | GG-60° |
| 12'/200° C. | 40–60 | 100 | 6.4–6.9 | 0 | 460.8 | 32 |
| 15'/200° C. | 50–60 | 100 | 6.8–7.5 | 0 | 576.0 | 34 |
| 20'/200° C. | 50–70 | 100 | 7.5–8.1 | 0 | 576.0 | 33 |
| 20'/180° C. | 60–70 | 100 | 6.1–6.4 | 0 | 345.6 | 31 |
| 25'/180° C. | 50–60 | 100 | 6.3–6.9 | 0 | 576.0 | 30 |
| 30'/180° C. | 50–60 | 100 | 7.0–7.8 | 0 | 691.2 | 33 |
| 25'/170° C. | 40–60 | 100 | 5.9–6.5 | 0 | 345.6 | 32 |
| 30'/170° C. | 50–70 | 100 | 7.0–7.2 | 0 | 460.8 | 33 |

EXAMPLE C-19

Pigmented enamel

The PCC having the following formula was prepared, applied, and baked-on at between 170° and 200° C., according to the method described above.
Polyester according to Example B1: 423.9
Crosslinking agent according to Example A14: 126.1
White pigment (TiO$_2$): 400.0
Leveling agent (master batch): 50.0

| Baking-on conditions | C-19 | | | | | |
|---|---|---|---|---|---|---|
| | Mechanical Characterizing data | | | | | |
| Time/Temp. | SD | HB | ET | GS | Imp. rev. | GG-60° |
| 12'/200° C. | 55–65 | 11 | 5.6–6.5 | 0 | 345.6 | 29 |
| 15'/200° C. | 50–60 | 100 | 7.1–7.8 | 0 | 460.8 | 26 |
| 20'/200° C. | 60–65 | 111 | 7.0 | 0 | 345.6 | 26 |

-continued

| C-19 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 20'/180° C. | 40–50 | 125 | 5.0 | 0 | 460.8 | 32 |
| 25'/180° C. | 50–60 | 100 | 5.8–7.0 | 0 | 360.4 | 28 |
| 30'/180° C. | 40–60 | 111 | 7.2–7.3 | 0 | 360.4 | 29 |
| 25'/170° C. | 50–60 | 111 | 5.2–5.4 | 0 | 230.4 | 29 |
| 30'/170° C. | 40–60 | 125 | 5.1–6.6 | 0 | 460.8 | 27 |

EXAMPLE C-20

Pigmented enamel

The PCC having the following formula was prepared, applied, and baked-on at between 170° and 200° C., according to the method described above.
Polyester according to Example B1: 394.2
Crosslinking agent according to Example A14: 125.8
White pigment (TiO$_2$): 400.0
Leveling agent (master batch): 50.0
Catalyst (master batch): 30.0

| C-20 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 12'/200° C. | 40–60 | 100 | 6.4–6.8 | 0 | 460.8 | 24 |
| 15'/200° C. | 60–70 | 100 | 6.5–7.1 | 0 | 691.2 | 22 |
| 20'/200° C. | 40–60 | 111 | 7.4–8.0 | 0 | 691.2 | 23 |
| 20'/180° C. | 40–60 | 100 | 5.3–5.5 | 0 | 576.0 | 25 |
| 25'/180° C. | 40–60 | 100 | 6.4–8.0 | 0 | 460.8 | 26 |
| 30'/180° C. | 50–70 | 100 | 7.2–7.5 | 0 | 576.0 | 25 |
| 25'/170° C. | 50–60 | 100 | 5.2–5.9 | 0 | 345.6 | 23 |
| 30'/170° C. | 55–70 | 111 | 5.1–5.5 | 0 | 460.8 | 25 |

EXAMPLE C-21

Pigmented enamel

The PCC having the following formula was prepared, applied, and baked-on at between 170° and 200° C., according to the method described above.
Polyester according to Example B1: 394.2
Crosslinking agent according to Example A14: 125.8
White pigment (TiO$_2$): 300.0
Leveling agent (master batch): 50.0
Catalyst (master batch): 30.0
Durcal ® 5: 100.0

| C-21 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 12'/200° C. | 50–60 | 100 | 6.1–6.3 | 0 | 230.4 | 20 |
| 15'/200° C. | 40–50 | 100 | 6.0–6.8 | 0 | 460.8 | 22 |
| 20'/200° C. | 50–65 | 111 | 6.9–7.3 | 0 | 345.6 | 20 |
| 20'/180° C. | 40–60 | 100 | 5.0–5.2 | 0 | 345.6 | 19 |
| 25'/180° C. | 50–70 | 111 | 5.8–6.0 | 0 | 460.8 | 21 |
| 30'/180° C. | 45–60 | 100 | 6.5–7.1 | 0 | 460.8 | 20 |
| 25'/170° C. | 50–70 | 100 | 4.4–5.4 | 0 | 230.4 | 22 |
| 30'/170° C. | 40–60 | 100 | 5.6–5.7 | 0 | 230.4 | 23 |

EXAMPLE C-22

Pigmented enamel

The PCC having the following formula was prepared, applied, and baked-on at between 160° and 200° C., according to the method described above.
Polyester according to Example B1: 425.4
Crosslinking agent according to Example A15: 124.6
White pigment (TiO$_2$): 400.0
Leveling agent (master batch): 50.0

| C-22 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 12'/200° C. | 60–70 | 100 | 5.8–6.0 | 0 | 806.4 | 41 |
| 15'/200° C. | 80 | 100 | 7.5–7.6 | 0 | 806.4 | 38 |
| 20'/200° C. | 70 | 100 | 7.3–7.8 | 0 | 806.4 | 38 |
| 20'/180° C. | 60–80 | 111 | 5.2–6.9 | 0 | 806.4 | 37 |
| 25'/180° C. | 60–70 | 100 | 8.2–8.4 | 0 | 806.4 | 39 |
| 30'/180° C. | 70 | 100 | 8.1–8.3 | 0 | 806.4 | 37 |
| 25'/170° C. | 60 | 111 | 5.2–6.0 | 0 | 576.0 | 41 |
| 30'/170° C. | 60–70 | 111 | 6.0–6.3 | 0 | 460.8 | 39 |
| 35'/160° C. | 45–55 | 100 | 6.4–6.8 | 0 | 691.2 | 45 |

EXAMPLE C-23

Pigmented enamel

The PCC having the following formula was prepared, applied, and baked-on at between 170° and 200° C., according to the method described above.
Polyester according to Example B3: 390.9
Crosslinking agent according to Example A15: 129.1
White pigment (TiO$_2$): 400.0
Leveling agent (master batch): 50.0
Catalyst (master batch): 30.0

| C-23 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 12'/200° C. | 40–65 | 111 | 6.5–7.0 | 0 | 576.0 | 48 |
| 15'/200° C. | 40–50 | 100 | 6.5–6.7 | 0 | 691.2 | 44 |
| 20'/200° C. | 55–65 | 100 | 6.7–7.1 | 0 | 691.2 | 45 |
| 20'/180° C. | 40–60 | 125 | 6.5–6.7 | 0 | 576.0 | 47 |
| 25'/180° C. | 60–75 | 111 | 5.9–6.1 | 0 | 460.8 | 49 |
| 30'/180° C. | 40–55 | 111 | 5.8–6.4 | 0 | 576.0 | 50 |
| 25'/170° C. | 50–60 | 100 | 4.9–5.5 | 0 | 230.4 | 47 |
| 30'/170° C. | 45–50 | 111 | 5.0–6.1 | 0 | 345.6 | 48 |

EXAMPLE C-24

Pigmented enamel

The PCC having the following formula was prepared, applied, and baked-on at between 170° and 200° C., according to the method described above.
Polyester according to Example B4: 414.5
Crosslinking agent according to Example A15: 105.4
White pigment (TiO$_2$): 400.0
Leveling agent (master batch): 50.0
Catalyst (master batch): 30.0

| C-24 | | | | | | |
|---|---|---|---|---|---|---|
| Baking-on conditions | Mechanical Characterizing data | | | | | |
| Time/Temp. | SD | HB | ET | GS | Imp. rev. | GG-60° |
| 12'/200° C. | 50–60 | 111 | 6.0–6.3 | 0 | 806.4 | 42 |

-continued

| C-24 Baking-on conditions Time/Temp. | Mechanical Characterizing data | | | | | |
|---|---|---|---|---|---|---|
| | SD | HB | ET | GS | Imp. rev. | GG-60° |
| 15'/200° C. | 50-55 | 100 | 6.2-6.5 | 0 | 806.4 | 41 |
| 20'/200° C. | 65-70 | 100 | 6.0-6.9 | 0 | 806.4 | 43 |
| 20'/180° C. | 40-50 | 125 | 5.5-6.1 | 0 | 806.4 | 40 |
| 25'/180° C. | 55-60 | 111 | 6.0-6.4 | 0 | 691.2 | 46 |
| 30'/180° C. | 45-60 | 111 | 6.2-6.7 | 0 | 806.4 | 45 |
| 25'/170° C. | 40-50 | 100 | 4.8-5.5 | 0 | 460.8 | 45 |
| 30'/170° C. | 45-60 | 100 | 5.0-5.7 | 0 | 576.0 | 46 |

EXAMPLE C-25

Pigmented enamel

The PCC having the following formula was prepared, applied, and baked-on at between 160° and 200° C., according to the method described above.
Polyester according to Example B1: 433.1
Crosslinking agent according to Example A16: 116.9
White pigment (TiO$_2$): 400.0
Leveling agent (master batch): 50.0

| C-25 Baking-on conditions Time/Temp. | Mechanical Characterizing data | | | | | |
|---|---|---|---|---|---|---|
| | SD | HB | ET | GS | Imp. rev. | GG-60° |
| 12'/200° C. | 40-60 | 100 | 8.7-9.2 | 0 | 806.4 | 46 |
| 15'/200° C. | 60-80 | 111 | 9.5-9.7 | 0 | >944.6 | 44 |
| 20'/200° C. | 60 | 111 | 9.6-9.7 | 0 | >944.6 | 44 |
| 20'/180° C. | 60 | 100 | 8.3-9.0 | 0 | 806.4 | 48 |
| 25'/180° C. | 60 | 100 | 9.0-9.4 | 0 | 806.4 | 46 |
| 30'/180° C. | 60-70 | 100 | 8.9-9.8 | 0 | >944.6 | 46 |
| 25'/170° C. | 50-60 | 100 | 8.4-9.0 | 0 | 806.4 | 48 |
| 30'/170° C. | 50-60 | 100 | 9.0-9.2 | 0 | >944.6 | 48 |
| 35'/160° C. | 50-60 | 100 | 6.3-7.4 | 0 | 691.2 | 48 |

EXAMPLE C-26

Pigmented enamel

The PCC having the following formula was prepared, applied, and baked-on at between 170° and 200° C., according to the method described above.
Polyester according to Example B3: 428.9
Crosslinking agent according to Example A16: 121.1
White pigment (TiO$_2$): 400.0
Leveling agent (master batch): 50.0

| C-26 Baking-on conditions Time/Temp. | Mechanical Characterizing data | | | | | |
|---|---|---|---|---|---|---|
| | SD | HB | ET | GS | Imp. rev. | GG-60° |
| 12'/200° C. | 50-60 | 100 | 7.1-8.0 | 0 | 691.2 | 51 |
| 15'/200° C. | 40-60 | 100 | 8.2-8.8 | 0 | 576.0 | 53 |
| 20'/200° C. | 45-55 | 100 | 8.5-9.3 | 0 | 806.4 | 52 |
| 20'/180° C. | 60-70 | 100 | 7.1-7.8 | 0 | 576.0 | 54 |
| 25'/180° C. | 50-60 | 100 | 8.4-8.9 | 0 | 691.2 | 50 |
| 30'/180° C. | 50-65 | 100 | 9.0-9.2 | 0 | 806.4 | 52 |
| 25'/170° C. | 45-60 | 100 | 7.5-7.7 | 0 | 576.0 | 51 |
| 30'/170° C. | 50-60 | 100 | 8.3-8.5 | 0 | 576.0 | 54 |

EXAMPLE C-27

Pigmented enamel

The PCC having the following formula was prepared, applied, and baked-on at between 160° and 200° C., according to the method described above.
Polyester according to Example B1: 441.0
Crosslinking agent according to Example A17: 109.0
White pigment (TiO$_2$): 400.0
Leveling agent (master batch): 50.0

| C-27 Baking-on conditions Time/Temp. | Mechanical Characterizing data | | | | | |
|---|---|---|---|---|---|---|
| | SD | HB | ET | GS | Imp. rev. | GG-60° |
| 12'/200° C. | 40-50 | 100 | 8.0-8.3 | 0 | >944.6 | 50 |
| 15'/200° C. | 60-70 | 100 | 8.3-8.9 | 0 | >944.6 | 48 |
| 20'/200° C. | 40-50 | 100 | 9.3->10 | 0 | >944.6 | 47 |
| 20'/180° C. | 60 | 100 | 9.2-9.7 | 0 | >944.6 | 50 |
| 25'/180° C. | 40-65 | 100 | 9.4->10 | 0 | >944.6 | 51 |
| 30'/180° C. | 40-60 | 100 | 9.5-9.9 | 0 | >944.6 | 49 |
| 25'/170° C. | 40-60 | 100 | 9.0-9.5 | 0 | >944.6 | 51 |
| 30'/170° C. | 60-70 | 100 | 9.2-9.9 | 0 | >944.6 | 51 |
| 35'/160° C. | 40-50 | 100 | 8.0-8.1 | 0 | >944.6 | 51 |

EXAMPLE C-28

Pigmented enamel

The PCC having the following formula was prepared, applied, and baked-on at between 170° and 200° C., according to the method described above.
Polyester according to Example B4: 457.9
Crosslinking agent according to Example A17: 92.1
White pigment (TiO$_2$): 400.0
Leveling agent (master batch): 50.0

| C-28 Baking-on conditions Time/Temp. | Mechanical Characterizing data | | | | | |
|---|---|---|---|---|---|---|
| | SD | HB | ET | GS | Imp. rev. | GG-60° |
| 12'/200° C. | 40-50 | 100 | 8.5-8.7 | 0 | 691.2 | 52 |
| 15'/200° C. | 50-60 | 111 | 8.2-9.0 | 0 | 806.4 | 55 |
| 20'/200° C. | 40-50 | 100 | 9.1-9.4 | 0 | 806.4 | 51 |
| 20'/180° C. | 50-65 | 100 | 7.9-8.5 | 0 | 576.0 | 53 |
| 25'/180° C. | 55-65 | 100 | 8.3-8.9 | 0 | 576.0 | 50 |
| 30'/180° C. | 40-55 | 111 | 8.7-9.6 | 0 | 806.4 | 52 |
| 25'/170° C. | 40-60 | 100 | 5.7-6.2 | 0 | 460.8 | 52 |
| 30'/170° C. | 50-60 | 100 | 7.1-7.7 | 0 | 576.0 | 51 |

EXAMPLE C-29

Pigmented enamel

The PCC having the following formula was prepared, applied, and baked-on at between 170° and 200° C., according to the method described above.
Polyester according to Example B4: 427.6
Crosslinking agent according to Example A18: 122.4
White pigment (TiO$_2$): 400.0
Leveling agent (master batch): 50.0

| C-29 Baking-on conditions Time/Temp. | Mechanical Characterizing data | | | | | |
|---|---|---|---|---|---|---|
| | SD | HB | ET | GS | Imp. rev. | GG-60° |
| 12'/200° C. | 50-60 | 100 | 7.5-8.0 | 0 | 806.4 | 53 |
| 15'/200° C. | 50-60 | 100 | 7.7-8.3 | 0 | >944.6 | 53 |
| 20'/200° C. | 40-55 | 100 | 7.8-9.0 | 0 | 806.4 | 53 |
| 20'/180° C. | 70 | 111 | 7.6-7.7 | 0 | 691.2 | 56 |
| 25'/180° C. | 40-50 | 111 | 7.9-8.4 | 0 | >944.6 | 54 |
| 30'/180° C. | 50-60 | 100 | 7.9-8.6 | 0 | >944.6 | 53 |
| 25'/170° C. | 65-70 | 100 | 7.6-7.8 | 0 | 576.0 | 56 |
| 30'/170° C. | 55-60 | 100 | 8.4-8.8 | 0 | 691.2 | 57 |

EXAMPLE C-30

Pigmented enamel

The PCC having the following formula was prepared, applied, and baked-on at between 170° and 200° C., according to the method described above.
Polyester according to Example B3: 423.2
Crosslinking agent according to Example A18: 126.8
White pigment (TiO$_2$): 400.0
Leveling agent (master batch): 50.0

| Baking-on conditions Time/Temp. | C-30 Mechanical Characterizing data | | | | | |
|---|---|---|---|---|---|---|
| | SD | HB | ET | GS | Imp. rev. | GG-60° |
| 12'/200° C. | 40-60 | 100 | 6.9-7.2 | 0 | 691.2 | 59 |
| 15'/200° C. | 50-60 | 100 | 7.4-7.9 | 0 | 691.2 | 58 |
| 20'/200° C. | 50-70 | 100 | 8.2-8.6 | 0 | 806.4 | 60 |
| 20'/180° C. | 45-60 | 100 | 7.0-7.2 | 0 | 576.0 | 60 |
| 25'/180° C. | 50-60 | 100 | 7.4-7.7 | 0 | 691.2 | 57 |
| 30'/180° C. | 50-65 | 100 | 7.2-8.0 | 0 | 691.2 | 59 |
| 25°/170° C. | 40-60 | 100 | 6.9-7.2 | 0 | 691.2 | 60 |
| 30'/170° C. | 50-60 | 100 | 7.5-7.8 | 0 | 860.4 | 61 |

EXAMPLE C-31

Pigmented enamel

The PCC having the following formula was prepared, applied, and baked-on at between 170° and 200° C., according to the method described above.
Polyester according to Example B1: 432.1
Crosslinking agent according to Example A19: 117.9
White pigment (TiO$_2$): 400.0
Leveling agent (master batch): 50.0

| Baking-on conditions Time/Temp. | C-31 Mechanical Characterizing data | | | | | |
|---|---|---|---|---|---|---|
| | SD | HB | ET | GS | Imp. rev. | GG-60° |
| 12'/200° C. | 60-70 | 100 | 8.1-8.8 | 0 | >944.6 | 64 |
| 15'/200° C. | 50-70 | 100 | 8.6-9.8 | 0 | >944.6 | 61 |
| 20'/200° C. | 55-60 | 100 | 9.6-9.8 | 0 | >944.6 | 61 |
| 20'/180° C. | 65-80 | 111 | 7.5-8.6 | 0 | >944.6 | 66 |
| 25'/180° C. | 55-60 | 100 | 9.0-9.7 | 0 | >944.6 | 64 |
| 30'/180° C. | 60 | 100 | 9.0-9.6 | 0 | >944.6 | 65 |
| 25'/170° C. | 65-70 | 111 | 8.4-8.8 | 0 | >944.6 | 66 |
| 30'/170° C. | 70-80 | 111 | 8.8-9.1 | 0 | 806.4 | 67 |

EXAMPLE C-32

(Comparison Example)

Pigmented enamel

The PCC having the following formula was prepared, applied, and baked-on at between 180° and 200° C., according to the method described above.
Polyester according to Example B1: 745.7
Crosslinking agent according to Example A20: 354.3
White pigment (TiO$_2$): 800.0
Leveling agent (master batch): 100.0

| Baking-on conditions Time/Temp. | C-32 Mechanical Characterizing data | | | | | | |
|---|---|---|---|---|---|---|---|
| | SD | HK | HB | ET | GS | Imp. rev. | GG-60° |
| 15'/200° C. | 60 | 177 | 111 | 9.5-9.6 | 0 | 806.4 | 85 |
| 20'/200° C. | 70-80 | 182 | 111 | 9.7-10 | 0 | 806.4 | 86 |
| 25'/200° C. | 60-65 | 183 | 100 | >10 | 0 | >944.6 | 85 |
| 20'/180° C. | 50-60 | 183 | 111 | 9.0-9.7 | 0 | 806.4 | 85 |
| 25'/180° C. | 60-70 | 185 | 111 | 10 | 0 | >944.6 | 85 |
| 30'/180° C. | 50-60 | 185 | 111 | >10 | 0 | >944.6 | 86 |

HK = Hardness, Koenig in sec (DIN 53 157)

EXAMPLE C-33

(Comparison Example)

Pigmented enamel

The PCC having the following formula was prepared, applied, and baked-on at between 170° and 200° C., according to the method described above.
Polyester according to Example B1: 820.0
Crosslinking agent according to Example A21: 280.0
White pigment (TiO$_2$): 800.0
Leveling agent (master batch): 100.0

| Baking-on conditions Time/Temp. | C-33 Mechanical Characterizing data | | | | | | |
|---|---|---|---|---|---|---|---|
| | SD | HK | HB | ET | GS | Imp. rev. | GG-60° |
| 10'/200° C. | 60-70 | 184 | 111 | 9.0-9.3 | 0 | >944.6 | 88 |
| 12'/200° C. | 60-70 | 185 | 111 | 9.6-10 | 0 | >944.6 | 90 |
| 15'/200° C. | 60-75 | 179 | 111 | >10 | 0 | >944.6 | 91 |
| 15'/180° C. | 60-80 | 180 | 111 | 9.4-9.5 | 0 | >944.6 | 89 |
| 20'/180° C. | 70-80 | 181 | 111 | >10 | 0 | >944.6 | 91 |
| 25'/180° C. | 60-80 | 187 | 111 | 9.7-9.9 | 0 | >944.6 | 90 |
| 25'/170° C. | 60 | 186 | 100 | 9.2-9.7 | 0 | >944.6 | 89 |
| 30'/170° C. | 70-80 | 185 | 111 | 9.6-9.9 | 0 | >944.6 | 90 |

EXAMPLE C-34

(Comparison Example)

Pigmented enamel

The PCC having the following formula was prepared, applied, and baked-on at between 170° and 200° C., according to the method described above.
Polyester according to Example B2: 418.1
Crosslinking agent according to Example A22: 131.9
White pigment (TiO$_2$): 400.0
Leveling agent (master batch): 50.0

| Baking-on conditions Time/Temp. | C-34 Mechanical Characterizing data | | | | | | |
|---|---|---|---|---|---|---|---|
| | SD | HK | HB | ET | GS | Imp. rev. | GG-60° |
| 10'/200° C. | 70-80 | 209 | 111 | 9.2-9.9 | 0 | 460.8 | 86 |
| 12'/200° C. | 70-80 | 206 | 111 | >10 | 0 | >944.6 | 89 |
| 15'/200° C. | 70-80 | 196 | 125 | >10 | 0 | >944.6 | 88 |
| 15'/180° C. | 60-80 | 208 | 125 | 9.2-9.8 | 0 | 576.0 | 89 |
| 20'/180° C. | 70-80 | 202 | 111 | >10 | 0 | >944.6 | 88 |
| 25'/180° C. | 60-70 | 194 | 111 | >10 | 0 | 944.6 | 89 |
| 20'/170° C. | 60-70 | 200 | 111 | 8.4-8.9 | 0 | 460.8 | 89 |
| 35'/170° C. | 70-80 | 198 | 111 | 9.4-9.6 | 0 | 691.2 | 90 |

EXAMPLE C-35

(Comparison Example)

Pigmented enamel

The PCC having the following formula was prepared, applied, and baked-on at between 170° and 200° C., according to the method described above.
Polyester according to Example B3: 412.2
Crosslinking agent according to Example A22: 137.8
White pigment (TiO₂): 400.0
Leveling agent (master batch): 50.0

| Baking-on conditions Time/Temp. | C-35 Mechanical Characterizing data | | | | | | |
|---|---|---|---|---|---|---|---|
| | SD | HK | HB | ET | GS | Imp. rev. | GG-60° |
| 10'/200° C. | 70-80 | 191 | 111 | 9.0 | 0 | 460.8 | 85 |
| 12'/200° C. | 60-70 | 199 | 111 | 8.6-10 | 0 | 691.2 | 88 |
| 15'/200° C. | 60-70 | 193 | 111 | >10 | 0 | >944.6 | 86 |
| 15'/180° C. | 80 | 195 | 111 | 7.5-8.0 | 0 | 460.8 | 86 |
| 20'/180° C. | 70-80 | 193 | 125 | 9.1->10 | 0 | 691.2 | 86 |
| 25'/180° C. | 60 | 192 | 125 | >10 | 0 | >944.6 | 86 |
| 20'/170° C. | 60-70 | 190 | 111 | 6.3-6.9 | 0 | 345.6 | 87 |
| 25'/170° C. | 70-80 | 189 | 111 | 7.8-8.5 | 0 | 576.0 | 85 |

EXAMPLE C-36

(Comparison Example)

Pigmented enamel

The PCC having the following formula was prepared, applied, and baked-on at between 180° and 200° C., according to the method described above.
Polyester according to Example B1: 380.0
Crosslinking agent according to Example A23: 170.0
White pigment (TiO₂): 400.0
Leveling agent (master batch): 50.0

| Baking-on conditions Time/Temp. | C-36 Mechanical Characterizing data | | | | | | |
|---|---|---|---|---|---|---|---|
| | SD | HK | HB | ET | GS | Imp. rev. | GG-60° |
| 10'/200° C. | 50-60 | 174 | 111 | 9.2-9.6 | 0 | 806.4 | 83 |
| 12'/200° C. | 60-75 | 183 | 111 | 9.7-9.9 | 0 | 806.4 | 84 |
| 15'/200° C. | 60-70 | 183 | 111 | 9.2-10 | 0 | >944.6 | 86 |
| 20'/180° C. | 60-70 | 184 | 111 | 8.6-9.3 | 0 | 806.4 | 85 |
| 25'/180° C. | 60-70 | 174 | 111 | 9.7-10 | 0 | >944.6 | 85 |
| 30'/180° C. | 50-60 | 181 | 111 | 10 | 0 | >944.6 | 82 |

EXAMPLE C-37

(Comparison Example)

Pigmented enamel

The PCC having the following formula was prepared, applied, and baked-on at between 180° and 200° C., according to the method described above.
Polyester according to Example B2: 388.7
Crosslinking agent according to Example A23: 161.3
White pigment (TiO₂): 400.0
Leveling agent (master batch): 50.0

| Baking-on conditions Time/Temp. | C-37 Mechanical Characterizing data | | | | | | |
|---|---|---|---|---|---|---|---|
| | SD | HK | HB | ET | GS | Imp. rev. | GG-60° |
| 15'/200° C. | 40-50 | 179 | 111 | 9.0-9.8 | 0 | >944.6 | 85 |
| 20'/200° C. | 50-60 | 181 | 125 | 9.5->10 | 0 | >944.6 | 83 |
| 25'/200° C. | 40-50 | 185 | 125 | 9.9-10 | 0 | >944.6 | 85 |
| 20'/180° C. | 40-50 | 180 | 111 | 8.6-9.0 | 0 | >944.6 | 85 |
| 25'/180° C. | 40-65 | 179 | 125 | 9.2-9.9 | 0 | >944.6 | 84 |
| 30'/180° C. | 50 | 181 | 111 | 9.5-9.8 | 0 | >944.6 | 85 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polyurethane powder coating composition with a matte surface after setting, comprising the following binder components:
   (i) an isocyanate component comprising:
      (a) an adduct of epsilon-caprolactam-blocked trans-1,4-cyclohexanediisocyanate with a diol or triol or mixtures thereof,
      (b) an epsilon-caprolactam-blocked trimer of trans-1,4-cyclohexanediisocyanate, and
      (c) epsilon-caprolactam-blocked trans-1,4-cyclohexanediisocyanate or epsilon-caprolactam-blocked isophoronediisocyanate or mixtures thereof, in the amount of 0.50 wt.% on the basis of the combined weight of (a) and (b); and
   (ii) an alcohol component comprising one or more OH-group-containing polymers.

2. The composition of claim 1, wherein said diol is selected from the group consisting of diols having the formula HO—(CH₂)ₙ—OH, wherein $2 \leq n \leq 12$ and diols having the formula HO—[—(CH₂)ₚ—O]ₘ—H, wherein m is 2 or 3 and p is 2-4.

3. The composition of claim 1, wherein said triol is 2,2-dihydroxymethyl-1-butanol.

4. The composition of claim 1, wherein said isocyanate component comprises the reaction product of epsilon-caprolactam-blocked trans-1,4-cyclohexanediisocyanate with a diol or triol and epsilon-caprolactam, wherein the NCO/OH equivalent ratio is in the range 2-7, and the NH/NCO ratio is in the range 0.8-1.

5. The composition of claim 1, wherein said isocyanate component comprises the reaction product of epsilon-caprolactam-blocked trans-1,4-cyclohexanediisocyanate and epsilon-caprolactam, wherein said isocyanate is obtained by trimerization and has a NCO content of 25-40%, and wherein the NH/NCO equivalent ratio is in the range 0.8-1.0.

6. The composition of claim 1, wherein the OH/NCO ratio for said OH-group containing polymer with respect to said isocyanate component is in the range 1:0.9-1:1.1.

7. The composition of claim 1, wherein said alcohol component comprises polyesters having a melting point in the range 70°-120° C.

* * * * *